Dec. 22, 1970    J. H. BOYER, JR., ET AL    3,548,614
METHOD OF CLOSING THE TOE OF A TUBULAR STOCKING
Filed April 7, 1969
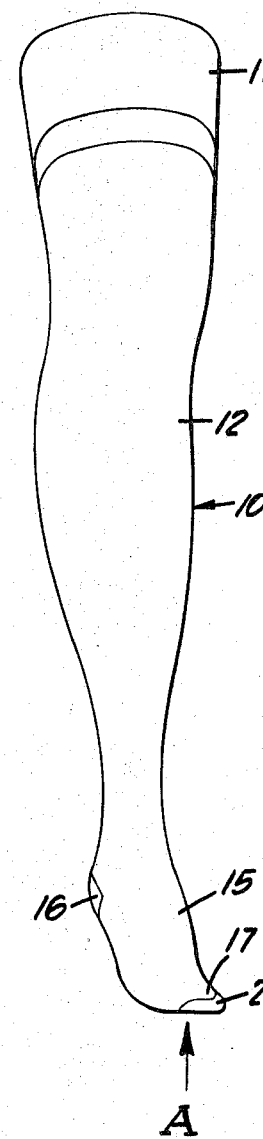
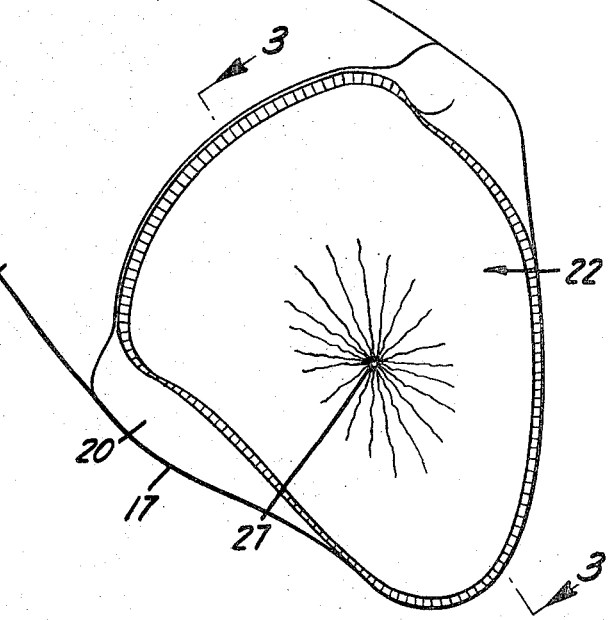
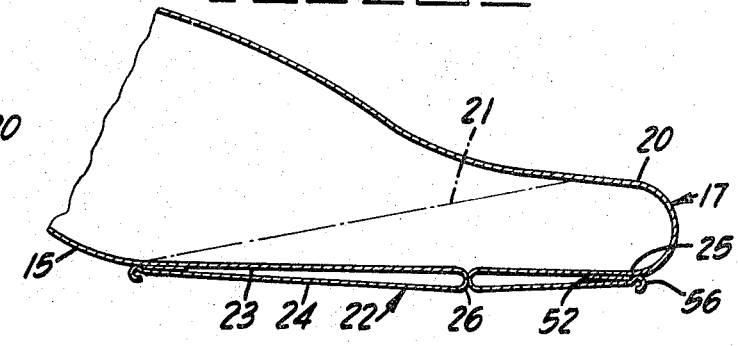
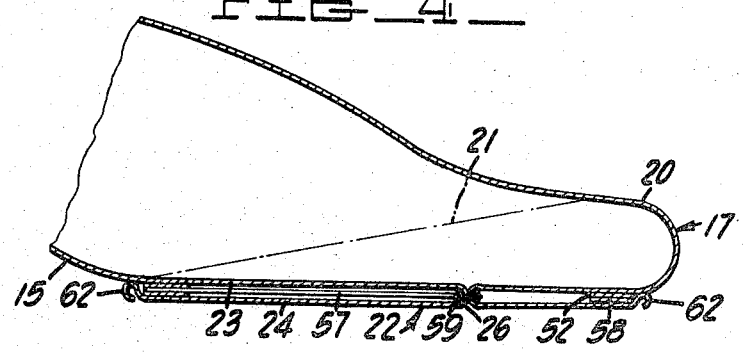

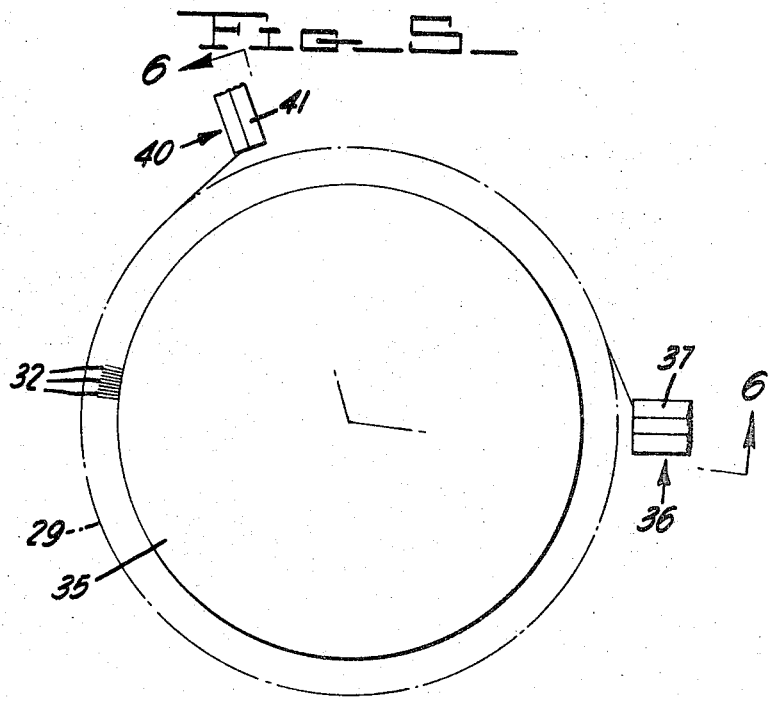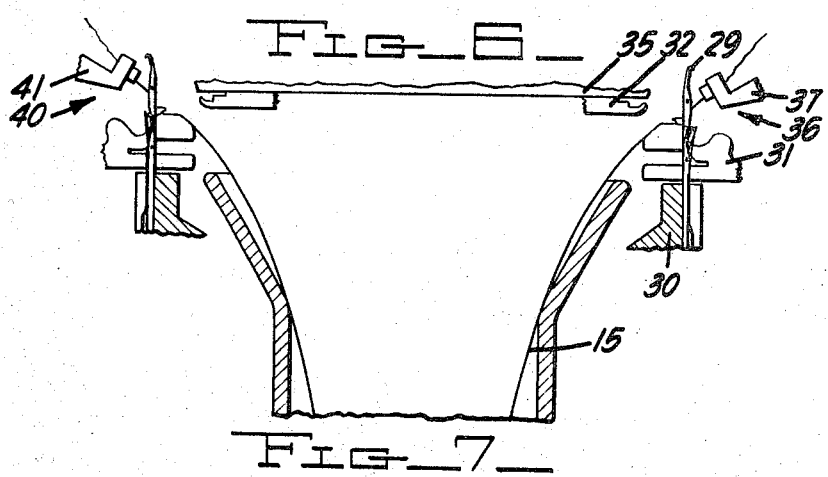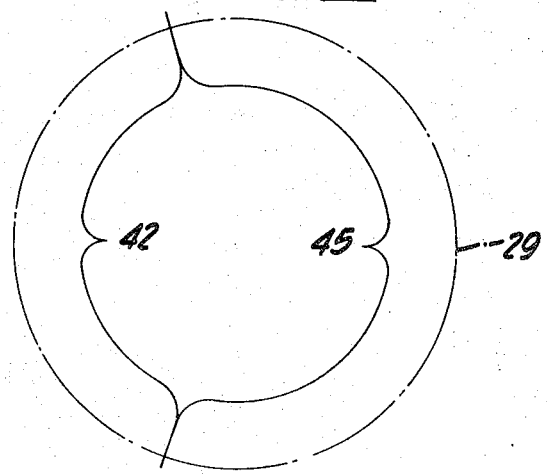

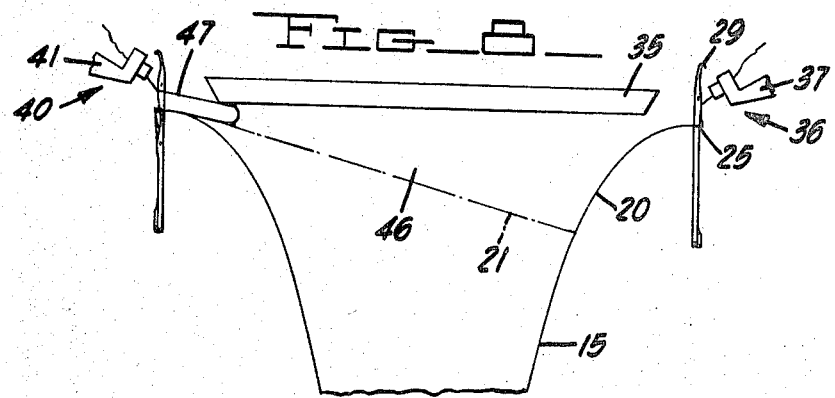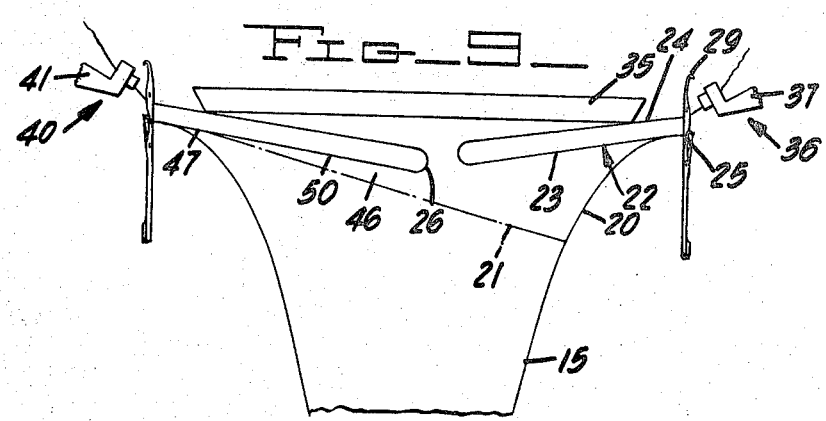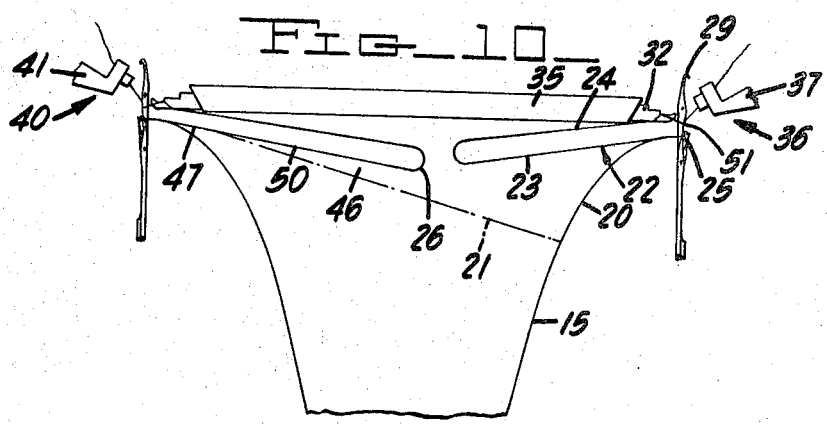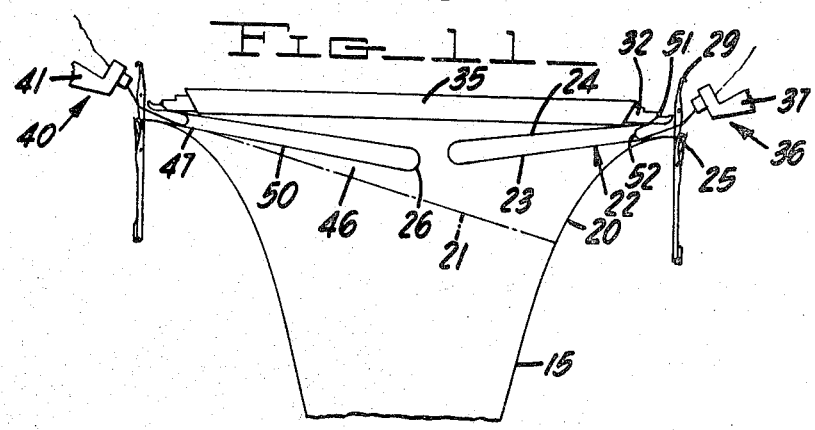

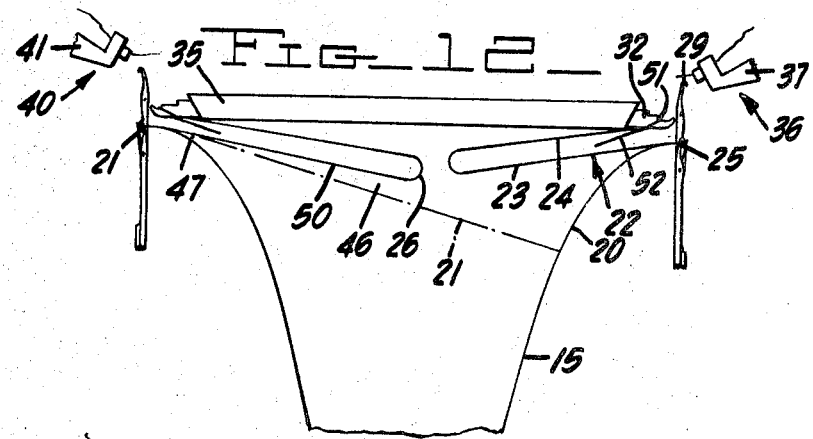
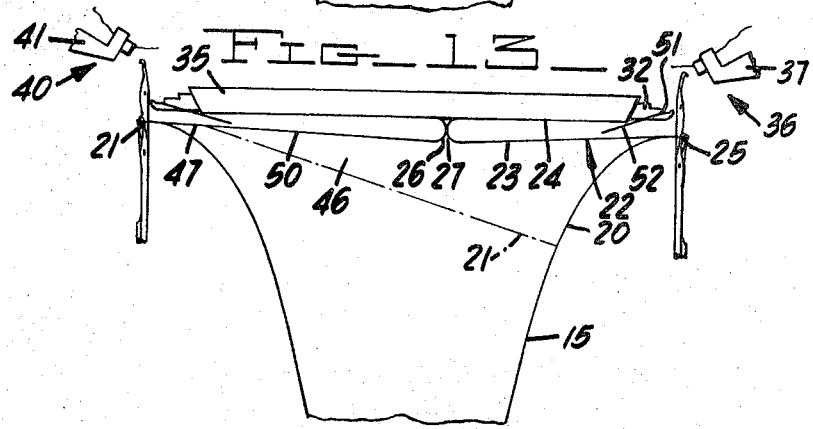
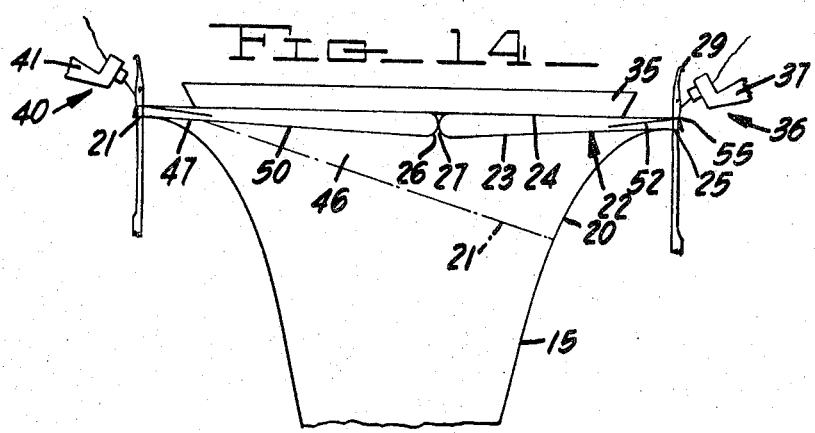
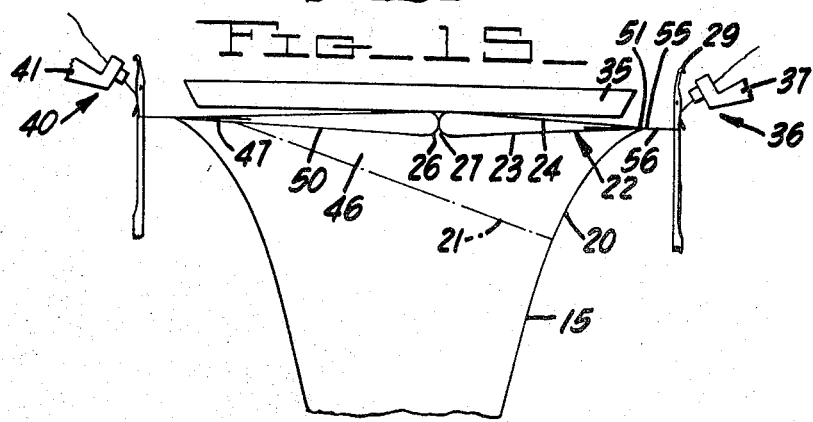

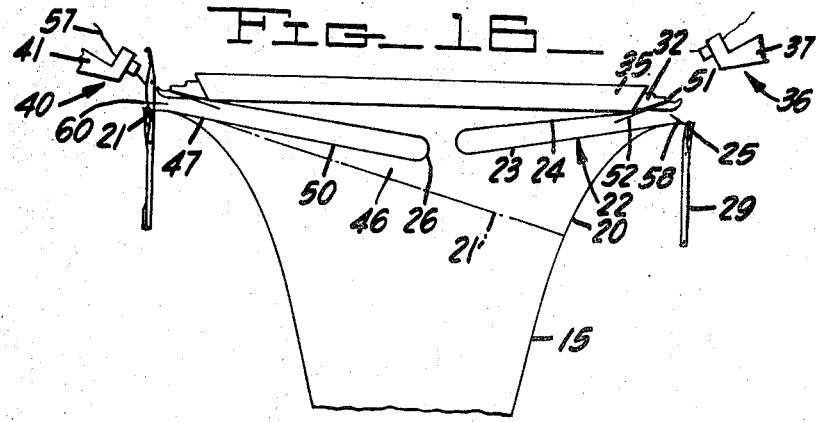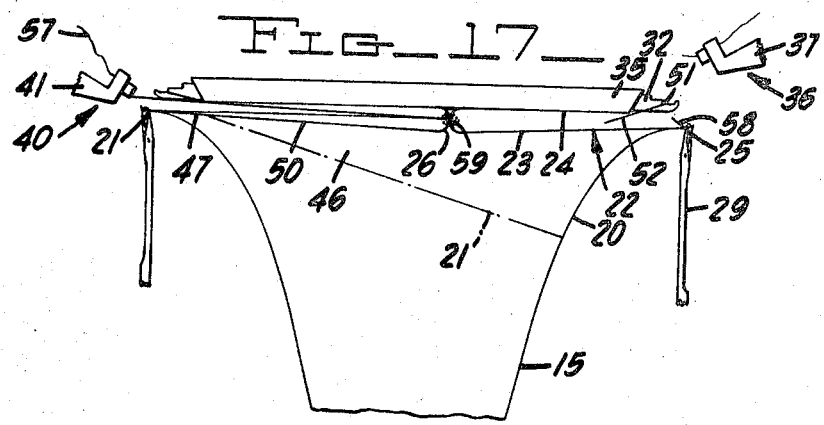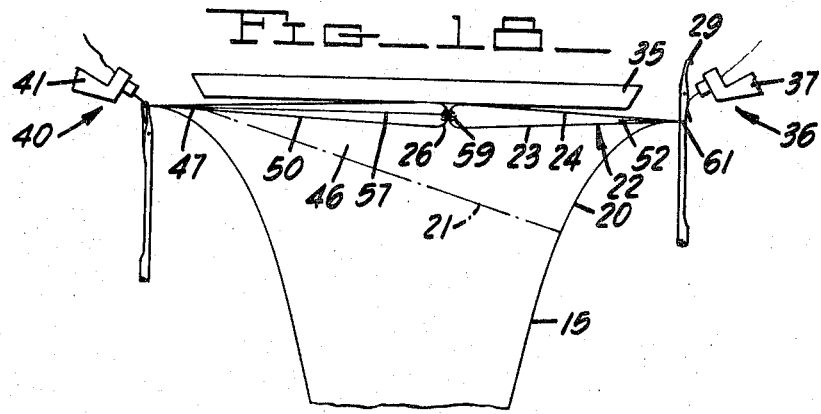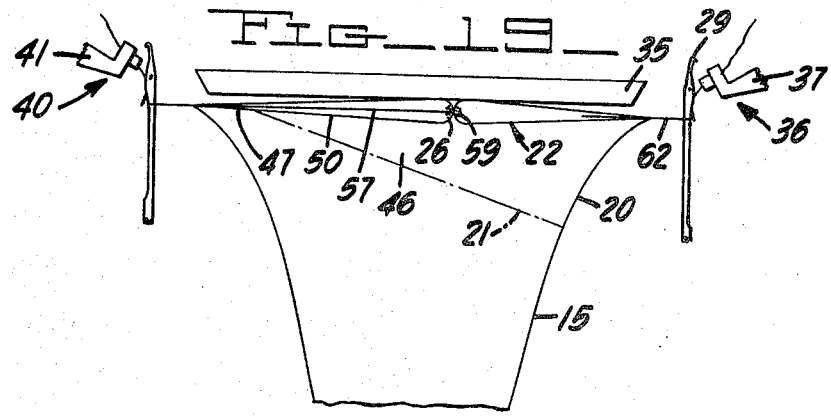

United States Patent Office 3,548,614
Patented Dec. 22, 1970

3,548,614
METHOD OF CLOSING THE TOE OF A TUBULAR STOCKING
James H. Boyer, Jr., Shillington, and Richard M. Janda, Crestwood, Reading, Pa., assignors to North American Rockwell Corporation, Pittsburgh, Pa., a corporation of Delaware
Filed Apr. 7, 1969, Ser. No. 814,027
Int. Cl. D04b 9/54, 9/56
U.S. Cl. 66—95                 6 Claims

ABSTRACT OF THE DISCLOSURE

A tubular fabric such as a lady's stocking having double ply welt, leg, foot and toe portions and a multi-ply portion beneath the foot portion adjacent the outer end of the toe portion and to methods of knitting the toe portion and closing the multi-ply portion thereof on a circular knitting machine.

BACKGROUUND OF THE INVENTION

Ladies' seamless stockings as conventionally knitted on circular knitting machines start with a rotary knitted tubular double ply welt portion followed by a rotary knitted tubular leg portion, a reciprocatorily knitted heel portion, a rotary knitted tubular foot portion and a reciprocatorily knitted toe portion. In knitting the toe portion, a gap or opening is formed therein as a result of the fashioning procedure and such opening is subsequently closed by a slow and tedious looping operation that greatly adds to the cost of the finished stockings. In order to reduce the cost of closing the toe portions by the looping procedure many of the stockings are now formed by extending the tubular foot portions to also include the toe portions and the latter are then shaped and closed by a trimming and seaming operation.

In efforts to reduce the manufacturing costs of the seamless stockings several new procedures have been developed for circular knitting machines by which the stockings are knitted and the toe portions thereof are closed on the knitting machines. In one of the procedures, such as disclosed in U.S. Pat. No. 3,327,500, the toe portion is started with the needles and dial bits alternately engaging the yarn of a transfer course in the same manner as in the formation of a conventional double ply welt of a seamless stocking. With bights of yarn of the transfer course held by the dial bits, the needles are operated to form a tubular fabric portion equal to twice the length of the toe portion. The needles are then rotated 360° relatively to the dial bits and the yarn bights held by the dial bits are transferred to the needles to form a twisted closed double ply toe portion in the stocking. When the stocking is knitted in a nonconventional manner starting at the toe portion and ending with the welt portion fabric defects ocur in both the leg and welt portions of the stocking due to the reversal of the conventional knitting procedure. On the other hand when the stocking is knitted in the conventional manner starting at the welt portion and ending at the toe portion a portion of the toe portion is formed around the foot portion and a separate operation is then required to strip the toe portion over the end of the foot portion which greatly reduces or entirely eliminates any cost savings made by closing the toe portion on the machine.

In another of the new procedures developed for knitting and closing the toe portion of a stocking on the same machine, such as that disclosed in the application of James D. Moyer, Ser. No. 704,809 filed Feb. 12, 1968 and assigned to the assignee of the instant invention, the toe, which also has two plies, is started with the needles and dial bits alternately engaging the yarn of a transfer or starting course. During subsequent formation of the two plies a wrap yarn is wrapped from a plurality of turns around the outer connected juncture courses of the plies to gather them into a bunch to close the outer end of the toe. With this procedure the stocking must be knitted in the non-conventional manner from toe to welt which, as above set forth, results in the formation of defects in both the leg and welt portions of the stocking.

In still further procedures developed for knitting and closing the toe portion of a stocking on a circular knitting machine, such as disclosed in the application of Richard M. Janda, Ser. No. 795,939 filed Feb. 3, 1969 and assigned to the assignee of the instant invention, the stocking is knitted in the conventional manner from welt to the terminal course of the foot portion of the stocking. Alternate needles are then operated along a non-knitting path with the stitches of the terminal course of the foot thereon while the intervening needles continue to knit first and second plies of the toe portion. As the terminal course of the second ply is formed the dial bits are operated to engage yarn bights thereof and a short fabric tab is then knitted to the inner terminal course. After the short fabric tab is knitted off the needles the outer ends of the plies are gathered and closed either by twisting the first and second plies relatively to each other in the manner of said Pat. No. 3,327,500 or by wrapping a yarn around the outer ends of the plies in the manner of said application Ser. No. 704,809. The stitches of the terminal course of the second ply are then transferred from the dial bits to the needles and connected to the terminal course of the foot by the first course of a second fabric tab.

While the toe portions of the stockings made by the procedures of said application Ser. No. 795,939 have eliminated the objections above noted in connection with the toe forming and closing procedures of said Pat. No. 3,327,500 and said application Ser. No. 704,809 all of procedures result in the formation of the closed outer end of the toe at the exact center thereof. This will normally cause the closed end of toe to be positioned at the extreme outer end of the finished stocking when it is subsequently boarded and set during the finishing procedures and will in turn cause the closed end to be positioned around the tips of the toes of a wearer in use. Since this is objectionable at least from the standpoint of appearance it has been the practice to manipulate the foot of the stocking as it is boarded until the closed end is beneath the foot of the finished stocking and the additional time required for this purpose adds to the cost of the finished stocking.

The instant invention has for its principle object the provision of a stocking with a toe portion having a multi-ply closed portion and of methods of knitting the toe portion and closing the multi-ply portion thereof on a circular knitting machine that will overcome the objections resulting in the formation of such stocking by the above noted prior procedures.

SUMMARY OF THE INVENTION

Briefly summarized the invention resides in the formation and closure of the toe portion of a seamless stocking knitted from welt to toe, the toe portion having a single ply portion with one end connected to the foot portion of the stocking at the upper side thereof, a multi-ply portion including inner and outer plies with the inner ends thereof in part connected to the foot portion at the underside thereof and in part connected to the other end of the single ply portion, and a single ply portion intermediate the inner and outer plies of the multi-ply portion with an inner end connected to the inner end of the outer ply and a free outer end. The outer connected ends of the inner and outer plies are adapted to be gathered into a bunch to close the multi-ply portion either by twisting the inner ends of the plies relatively to each other or by wrapping a wrap yarn around the outer connected ends of the plies. The single ply portion of the toe portion acts to shift the closed multi-ply portion to the under side of the foot portion of the stocking.

BRIEF DESCRIPTION OF THE DRAWINGS

FIG. 1 is a view of a stocking having a toe portion made in accordance with one embodiment of the instant invention;

FIG. 2 is a view on an enlarged scale of a portion of the foot of the stocking of FIG. 1 taken in the direction of the arrow A;

FIG. 3 is a cross-sectional view on an enlarged scale taken on the line and in the direction of the arrows 3—3 of FIG. 2;

FIG. 4 is a view similar to FIG. 3 showing a modified embodiment of the toe portion of the invention;

FIG. 5 is a schematic plan view of a portion of a multifeed circular knitting machine adapted to make stockings incorporating the toe portions of FIGS. 1 to 4;

FIG. 6 is a cross-sectional view taken substantially along the line and in the direction of the arrows 6—6 of FIG. 5 and showing certain parts of the machine during one step in the formation of the toe portions of FIGS. 1 to 4;

FIG. 7 is a schematic plan view of the needle circle of the machine illustrating the condition of the needles during the step in the formation of the toe portions shown in FIG. 6;

FIGS. 8 to 15 are views similar to FIG. 6 showing further steps in the formation of the toe portion of FIG. 3; and FIGS. 16 to 19 are views similar to FIG. 6 showing steps in the formation of the toe portion of FIG. 4.

Referring to FIGS. 1 and 2 of the drawings there is shown a lady's seamless stocking 10 having a tubular double ply welt 11, a tubular leg portion 12, a tubular foot portion 15, a heel pocket 16 and a toe portion 17. The welt, leg and foot portions of the stocking 10 are conventionally formed during rotary knitting on a circular knitting machine, to be hereinafter described, and the heel pocket is conventionally formed either by rotary knitting or reciprocatory knitting by methods well known in the prior art. The stocking 10 is knitted starting at the welt portion and ending at the toe portion. The welt leg and foot portions are shown to indicate essential parts of the stocking but otherwise form no part of the instant invention.

The toe portion 17 of the stocking 10 includes a single ply portion 20 which is connected to and extends outwardly over the upper surface and outer end of the toe portion from a terminal course 21 of the foot portion 15 and a multi-ply portion 22, which is positioned beneath the toe end of the foot, having first or inner and second or outer plies 23 and 24, respectively, with inner ends which are in part connected to the terminal course of the foot and in part connected to a terminal course 25 of the single ply portion and outer connected ends, indicated at 26 in FIG. 3. The toe portion is formed and the outer connected ends 26 of the inner and outer plies of the multi-ply portion 22 are gathered and closed, as indicated at 27 in FIG. 2, as hereinafter set forth.

The stocking 10 is adapted to be knitted on a conventional circular knitting machine as, for example, one of the type shown in U.S. Pat. No. 3,327,500. The machine has a usual circle of independently operated latch needles 29 (FIGS. 5 and 6) which are slidably mounted in a cylinder 30 adapted for both rotary and reciprocatory operation, sinkers 31 cooperating with the needles, and dial bits 32 which are mounted in a dial 35. The dial 35 and dial bits 32 are normally operated in synchronism with the cylinder 30 and needles 29 in forming the double ply welt portion 11 of the stocking 10. The machine has a main knitting station 36 having yarn fingers 37 and cams (not shown) for operating the needles in cooperation with the sinkers to knit yarns fed thereto into courses of stitches during both rotary and reciprocatory operation of the machine in forming the stocking 10. The machine also has a second or auxiliary knitting station 40 having yarn fingers 41 and cams (not shown) for operating the needles to knit yarns fed thereto into courses of stitches to, with the main knitting station 36, form multifeed portions of the stocking 10 during rotary operation of the machine. The machine also includes selecting means at each of the stations for causing certain selected needles to follow a knitting path and for causing other selected needles to follow tucking and non-knitting or float paths to form design stitches generally in the manner disclosed in U.S. Pat. 3,205,683.

In forming the stocking 10 on the machine referred to herein, the stocking is knitted from welt to toe. When the stocking is to be knitted throughout of circular connected courses the welt portion 11 is formed of relatively heavy yarns and the leg and foot portions 12 and 15, respectively, are formed of light weight yarns fed to all of the needles by yarn fingers 37 and 41 at stations 36 and 40, respectively, and the heel pocket 16 is formed by feeding a relatively heavy yarn with the light weight yarns to a group of the needles commonly referred to as the heel needles at both stations during rotary operation of the machine. On the other hand when the stocking is to include a reciprocated heel pocket the auxiliary station 40 is inactivated at the end of the leg portion and the heel pocket is then knitted of reinforcing yarns at the main station on the heel group of the needles during reciprocatory operation of the machine in the usual manner. At completion of the heel pocket the auxiliary station 40 is again activated to knit with the main station 36 to form courses of light weight yarns in the foot portion 15.

Following formation of the terminal course 21 of the foot portion 15, which may be knitted at either station 36 or 40, alternate needles of a group of needles in the heel side of the needle cylinder, indicated by the bracket 42 in FIG. 7, are inactivated by causing them to follow non-knitting paths, as indicated by the needles in the low position of FIG. 6, at both stations with alternate stitches of the terminal course 21 suspended thereon. The intermediate or intervening needles of the group 42 and all of the remaining needles of the needle circle in the instep side of the cylinder, indicated by the bracket 45 in FIG. 7, then continue to operate along knitting paths, as indicated by the high position of the needles in FIG. 6, at both stations 36 and 40 to knit courses of heavy yarn fed thereto by yarn fingers at both stations to form a first fabric section 46 including a first portion 47 of the multiply portion 22 of the toe portion knitted by the intervening needles of the group 42 to the intervening stitches of the terminal course 21 and the single ply portion 20 knitted by all of the needles of the group 45 to the stitches of the terminal course of the foot portion 15 (FIG. 8). Alternately, after the first course of the first portion 47 of the fabric section 46 is knitted by the intervening needles of the group 42 at one of the stations every other intervening needle of the group 42 is inactivated to follow the non-knitting or float path with the alternate needles at the other station to form the second course of the portion 47 and the remaining courses of the portion 47 are then alternately formed by the intervening needles at the one station and by every other intervening needle at the other station.

Following formation of the terminal course 25 (FIG. 8) of the single ply portion 20, which is also the terminal course of first portion 47 of the multi-ply portion 22 of the toe portion 17, alternate needles of the group 45 are inactivated, with the alternate needles of the group 42, with the stitches of the terminal course 25 of the single ply portion suspended thereon. Also at this time light weight yarns are substituted for the heavy yarns at both stations. The intervening needles of both groups 42 and 45 then continue to operate along knitting paths at both stations 36 and 40 to knit the light weight yarns into courses of a second fabric section 50 (FIG. 9) to partially form the inner and outer plies 23 and 24 of the multi-ply portion 22 of the toe portion 17. As indicated at the right side of FIG. 9, which is for illustrative purpose only, the portions of the inner and outer plies 23 and 24 knitted by the intervening needles of the group 45 include only the courses of the second section 50 connected to the terminal course 25 of the single ply portion 20 of the toe portion 17 while the portions of the inner and outer plies knitted by the intervening needles of the group 42 include courses of both the first portion 47 of the first fabric section 46 connected to the terminal course 21 of the foot portion 15 and the second section 50. Preferably, a few courses before the formation of a terminal course 51 of the second fabric section 50 a reinforcing yarn is fed with the light weight yarn to the intervening needles at both stations to form the remaining courses of the second fabric section.

During formation of an inner terminal course 51 of the second fabric section 50, which is knitted at the main station 36, the dial bits 32 are operated to engage bights of the yarn extending between the stitches of the course 51 formed by the intervening needle (FIG. 10). With the yarn bights of the course 51 suspended from the dial bits courses are knitted by the intervening needles at both knitting stations to form a first short fabric tab 52 (FIG. 11) having one end connected to the course 51. Following formation of the last course of the fabric tab 52 the yarn fingers at both stations are inactivated and the yarns thereof servered which causes the stitches of the last course of the tab to be cast or knitted off the intervening needles (FIG. 12). With the terminal course 51 of the second section 50 and the fabric tab 52 suspended from the dial bits 32 the dial 35 is disconnected from its driving means and the needles are rotated relatively to the dial bits to twist the inner ply 23 relatively to the outer ply 24 and fabric tab 52. This twisting of the plies causes the outer connected ends 26 thereof to be gathered into a bunch to close the multi-ply portion at 27 (FIGS. 2 and 13) in the manner set forth in said U.S. Pat. No. 3,327,500.

After the dial is reconnected to its operating means the alternate needles are activated to operate with the dial bits to transfer the yarn bights of the inner terminal course 51 of the fabric section 50 from the dial bits to the alternate needles (FIG. 14). The transfer of the yarn bights of the terminal course 51 occurs at the main station 36 and a yarn finger is activated at this station to feed yarn to all of the needles to knit a first course 55 of a second short fabric tab 56 (FIG. 15) to connect the yarn bights of the course 51 with the stitches of the terminal course 21 of the foot portion 15 on the alternate needles of the group of needles 42 and the stitches of the terminal course 25 of the single ply portion 20 on the alternate needles of the group of needles 45. A yarn finger is also activated at the auxiliary station 40 to feed its yarn to all of the needles to form a second course of the fabric tab 56 and knitting then continues at both stations to form the remaining courses of the tab 56 to complete the stocking.

In the embodiment of the invention shown in FIGS. 4 and 16 to 19 the single ply portion 20, the inner and outer plies 23 and 24 of the multi-ply portion 22 and the first fabric tab 52 are knitted in the manner described in connection with FIGS. 6 to 13. At this time the yarn fingers at both stations are in inactive positions and the terminal course 51 of the second fabric section 50 and the first short fabric tab 52 are suspended from the dial bits 32, as shown in FIG. 13.

All of the intervening needles of the needle circle are inactivated to follow the non-knitting path with the alternate needles at the main station and a yarn finger 41 is then moved to active position at the auxiliary station 40 to feed a wrap yarn 57 to the intervening needles, which remain active at the latter station, to knit courses of a second short fabric tab 58 including a terminal course 60, as shown in FIG. 16, to anchor the ingoing end of the wrap yarn. Following formation of the terminal course 60 of the tab 58, the intervening needles are inactivated with the stitches of the course 60 suspended thereon by causing the intervening needles to follow the non-knitting path with the alternate needles while the yarn finger at the auxiliary station 40 is lowered from its normal active feeding position to a low feeding position as indicated in FIG. 17 and as disclosed in said application Ser. No. 704,809 hereinbefore referred to. Tension is then applied to the wrap yarn and thereafter, with all of the needles following the non-knitting path the cylinder and needles are rotated idly to carry the wrap yarn 57 between the inner and outer plies and then wrap it around the outer ends 26 of the plies for a plurality of turns, indicated at 59 in FIGS. 4 and 17, to gather them into a bunch to close the outer end of the multi-ply portion 22 at 27 as indicated in FIG. 3 and as disclosed in said application Ser. No. 704,809. The alternate needles are then operated with the dial bits to transfer the yarn bights of the inner terminal course 51 of the outer ply 24 from the dial bits to the alternate needles at the main station 36 (FIG. 18). All of the needles are then activated to follow the knitting path at the main station to knit a first course 61 of a third short fabric tab 62 to interknit the stitches of the terminal course 21 of the foot portion 15 and the yarn bights of the inner terminal course 51 of the second fabric section 50 on the alternate needles and the terminal course 60 of the second tab 58 on the intervening needles. At this time the first tab 52 and the second tab 58 are enclosed within the inner ends of the inner and outer plies 23 and 24, as shown in FIG. 19. After the yarn finger for the wrap yarn is returned to normal feeding position the wrap yarn is fed to all of the needles to knit a second course of the third tab 62 to anchor the trailing end of the wrap yarn and the remaining courses of the latter tab are then knitted by all of the needles at both stations to complete the stocking.

From the foregoing it is believed to be obvious that the above described procedures will result in the formation of a seamless stocking starting at the welt and ending at the toe portion thereof and with the toe portion having a closed multi-ply portion which is positioned at the bottom of the foot portion of the stocking.

Also while the methods of the invention have been described in connection with a machine having two knitting stations it is believed to be obvious that the same methods may be carried out on machines having more than two knitting stations with the various portions of the toe being formed at some or all of the knitting stations. Furthermore, where the toe portion 17 of FIG. 4 is described as being closed by a wrap yarn fed at only the auxiliary knitting station, a similar wrap yarn may also be fed at the main knitting station of the machine shown herein or at a pair of knitting stations of machines having more than two knitting stations to form the courses of the tab 58 and then wrapped around the outer ends of the inner and outer plies to close the multi-ply portion of the toe.

It will be understood that the improvement specifically shown and described by which the above results are obtained can be changed and modified in various ways without departing from the invention disclosed and hereinafter claimed.

We claim:

1. A method of forming a tubular stocking having a double ply welt portion, leg and foot portions, and a toe having a closed multi-ply portion and a single ply portion on a circular knitting machine having a circle of needles, dial bits cooperating with alternate needles of said circle and means for feeding yarns to said needles including the steps of (a) knitting yarns fed to all of the needles of said circle and forming courses of stitches of said welt, leg and foot portions including a terminal course of said foot portion, (b) inactivating alternate needles of a first portion of said circle with said stitches of said terminal course of said foot portion suspended thereon, (c) knitting yarn fed to needles intermediate said alternate needles of said first portion of said circle and all of the needles of a second portion of said circle and forming courses of a first fabric section of said toe having an inner end connected to stitches of said terminal course of said foot portion and a terminal course at the other end thereof, (d) inactivating alternate needle of said second portion of said circle, (e) knitting yarn fed to said intermediate needles of said first portion of said circle and to needles intermediate said alternate needles of said second portion of said circle and forming courses of a second fabric section having one end connected to said terminal course of said first fabric section and an inner terminal course, the portion of said first fabric section knitted by said needles of said first portion of said circle and said second fabric section forming inner and outer plies of said multi-ply portion of said toe with outer connected ends, and the portion of said first fabric section knitted by said needles of said second portion of said circle forming said single ply portion of said toe, (f) engaging said dial bits with bights of yarn connecting the stitches of said inner terminal course of said second fabric section, (g) knitting yarn fed to said intermediate needles of said first and second portions of said circle and forming courses of a first fabric tab having one end connected to said inner terminal course of said second fabric section and a terminal course at the other end thereof, (h) casting said terminal course of said first fabric tab from said intermediate needles, (i) gathering said outer connected ends of said inner and outer plies of said multi-ply portion into a bunch to close said multi-ply portion, (j) transferring said yarn bights engaged by said dial bits to said alternate needles of said first and second portions of said circle and enclosing said first fabric tab within said inner and outer plies, and (k) knitting yarn fed to all of the needles of said circle and forming a first course of a second fabric tab to connect the stitches of said foot portion formed by the needles of said first portion of said circle and the stitches of said terminal course of said first fabric section formed by the needles of said second portion of said circle and said yarn bights of said inner terminal course of said second fabric section on said alternate needles.

2. A method according to claim 1 in which said step (i) comprises rotating said circle of needles relatively to said dial bits to twist said inner ply relatively to said outer ply and said first fabric tab.

3. A method according to claim 1 in which said step (i) comprises wrapping a yarn for a plurality of turns around said outer connected ends of said inner and outer plies.

4. A method according to claim 1 in which the portion of said inner end of said first fabric section knitted by said alternate needles of said first portion of said circle is connected to said terminal course of said foot portion at the underside thereof and the portion of said inner end of said first fabric section knitted by all of the needles of said second portion of said circle is connected to said terminal course of said foot portion at the upper side thereof.

5. A method of forming a tubular stocking having a double ply welt portion, leg and foot portions and a toe having a closed multi-ply portion and a single ply portion on a circular knitting machine having a circle of needles, dial bits cooperating with alternate needles of said circle and means for feeding yarns to said circle of needles including the steps of (a) knitting yarns fed to all of the needles of said circle and forming courses of stitches of said welt, leg and foot portions including a terminal course of said foot portion, (b) inactivating alternate needles of a first portion of said circle with said stitches of said terminal course of said foot portion suspended thereon, (c) knitting yarn fed to needles intermediate said alternate needles of said first portion of said circle and all of the needle of a second portion of said circle and forming courses of a first fabric section having one end connected to stitches of said terminal course of said foot portion and a terminal course at the other end thereof, (d) inactivating alternate needles of said second portion of said circle, (e) knitting yarn fed to said intermediate needles of said first portion of said circle and said needles intermediate said alternate needles of said second of said circle and forming courses of a second fabric section having one end connected to said terminal course of said first fabric section and a terminal course at the other end thereof, the portion of said first fabric section knitted by said needles of said first portion of said circle and said second fabric section forming inner end outer plies of said multi-ply portion of said toe and the portion of said first fabric section knitted by said needles of said second portion of said circle forming said single ply portion of said toe, (f) engaging said dial bits with bights of yarn connecting the stitches of said terminal course of said second fabric section, (g) knitting yarn fed to said intermediate needles of said first and second portions of said circle and forming courses of a first fabric tab having one end connected to said terminal course of said second fabric section and a terminal course at the other end thereof, (h) casting said terminal course of said first fabric tab from said intermediate needles, (i) knitting a wrap yarn fed to said intermediate needles of said first and second portions of said circle and forming courses of a second fabric tab including a terminal course on said intermediate needle to anchor the leading end of said wrap yarn, (j) inactivating said intermediate needles with stitches of said terminal course of said second tab thereon, (k) wrapping said wrap yarn for a plurality of turns around said outer connected ends of said inner and outer plies to gather said outer connected ends into a bunch to close said multi-ply portion of said toe, (l) transferring said yarn bights of said terminal course of said second fabric section from said dial bits to said alternate needles of said first and second portions of circle and enclosing said first and second tabs within said inner and outer plies, and (m) knitting yarn fed to all of the needles of said circle and forming a first course of a third fabric tab to connect the stitches of the terminal course of said foot portion, the stitches of said terminal course of said first fabric section, and the yarn bights of said terminal course of said second fabric section on said alternate needles and said terminal course of said second tab on said intermediate needles.

6. A method according to claim 5 including the additional step of
(n) knitting said wrap yarn fed to all of the needles of said circle and forming at least a second course of said third tab to anchor the trailing end of said wrap yarn.

References Cited

UNITED STATES PATENTS

| | | | |
|---|---|---|---|
| 2,740,279 | 4/1956 | Getaz | 66—187 |
| 3,254,509 | 6/1966 | Tenconi | 66—41 |
| 3,301,012 | 1/1967 | Tenconi | 66—41 |
| 3,340,706 | 9/1967 | Currier | 66—26 |
| 3,453,843 | 7/1969 | Knohl et al. | 66—187X |

FOREIGN PATENTS

| | | | |
|---|---|---|---|
| 1,107,712 | 3/1968 | Great Britain | 66—187 |
| 466,887 | 2/1969 | Switzerland | 66—187 |

OTHER REFERENCES

The Hosiery Trade Journal, April 1968, vol. 75, No. 892, p. 147, copy in 66/187.

WM. CARTER REYNOLDS, Primary Examiner

U.S. Cl. X.R.

66—187